United States Patent [19]

Reed, III

[11] 4,343,447

[45] Aug. 10, 1982

[54] DECOUPLER PYLON: WING/STORE FLUTTER SUPPRESSOR

[75] Inventor: Wilmer H. Reed, III, Hampton, Va.

[73] Assignee: The United States of America as represented by the Administrator of the National Aeronautics and Space Administration, Washington, D.C.

[21] Appl. No.: 135,057

[22] Filed: Mar. 28, 1980

[51] Int. Cl.³ .......................... B64D 1/00; B64D 9/00
[52] U.S. Cl. ............................. 244/137 R; 244/118.1; 89/1.5 G
[58] Field of Search ............ 244/137 R, 118.1, 135 R; 89/1.5 B, 1.5 G; 267/DIG. 1, 65 D; 280/678, 714, 112 A

[56] References Cited

U.S. PATENT DOCUMENTS

| | | | |
|---|---|---|---|
| 1,207,492 | 12/1916 | Buck | 89/1.5 B |
| 2,974,675 | 3/1961 | Cislo | 280/714 |
| 3,170,371 | 2/1965 | Zimmer et al. | 89/1.5 B |
| 3,176,939 | 4/1965 | Mard et al. | 244/118.1 |
| 3,268,188 | 8/1966 | La Roe et al. | 244/118.1 |
| 3,904,156 | 9/1975 | Smith | 244/118.1 |
| 4,168,046 | 9/1979 | Hasquenoph et al. | 244/137 R |
| 4,246,472 | 1/1981 | Sun et al. | 244/137 |

FOREIGN PATENT DOCUMENTS 326527   4/1930   United Kingdom ............... 89/1.5 B

*Primary Examiner*—Trygve M. Blix
*Assistant Examiner*—C. T. Bartz
*Attorney, Agent, or Firm*—Howard J. Osborn; John R. Manning; Wallace J. Nelson

[57] ABSTRACT

This is a device for suspending a store 15 from a support such as an aircraft wing 10, and more specifically for increasing the flutter speed of an aircraft flying with attached store and reducing the sensitivity of flutter to changes in the pitch inertia and center of gravity location of the store. It comprises soft-spring whereby the store pitch mode is decoupled from support modes and a low frequency active control mechanism which maintains store alignment. In the described embodiment, a pneumatic suspension system 30 both isolates the store 15 in pitch and, under conditions of changing mean load, aligns the store 15 with the wing 10 to which it is attached.

12 Claims, 5 Drawing Figures

DECOUPLER PYLON: WING/STORE FLUTTER SUPPRESSOR

ORIGIN OF THE INVENTION

The invention described herein was made by an employee of the U.S. Government and may be manufactured and used by or for the Government for governmental purposes without the payment of any royalties thereon or therefor.

BACKGROUND OF THE INVENTION

This invention has been designed to alleviate flutter and suppress vibration of stores suspended from a support such as an aircraft wing.

Flutter is a dangerous aerodynamic instability which affects lifting surfaces in a fluid flow. Flutter speed is the speed at which a given aircraft will begin to experience these self-induced oscillations. The vibrations which characterize flutter have potentially catastrophic results; aircraft have literally broken apart because of flutter.

Classical bending-torsion flutter involves coupling of at least two natural vibration modes, one or more of which contain torsional deformations of the wing. The frequencies of bending and torsion modes vary with airspeed and couple as flutter is approched.

Current fighter/attack aircraft are required to carry a vast number of external, wing or fuselage mounted stores. With multiple store attachment locations on the wing, each designed to accommodate an array of store configurations, some having variable mass (e.g., fuel tanks and rocket pods), there are literally thousands of possible store loading combinations for a single aircraft. The attachment of a store mass to a wing alters the dynamic characteristics of the structure and often causes drastic reductions in the flutter speed, which can result in catastrophic structural failures. Extensive and costly effort in the form of mathematical analyses, wind tunnel mode tests, and flight flutter tests are performed to assure safety from flutter.

For flutter critical store configurations either the flutter speed must be raised by some means or restrictions placed on the aircraft operating envelope. The flutter speed can be raised by conventional passive methods or by more advanced methods involving active flutter suppression. Some examples of passive methods are: adding mass ballast, tuning the store pylon stiffness characteristics or relocating the wing store attachment point. Passive schemes of this kind are generally tailored for a specific store configuration and are not readily changed to accommodate the necessary broad range of store mass and inertia combinations.

Active flutter suppression concepts have been the subject of considerable research in recent years. In this approach the flutter mode response is sensed by a transducer whose electrical output is modified by an appropriate control law and fed back to a control surface actuator to produce an aerodynamic force opposing flutter. Compared with passive methods, active control of flutter has the advantage of possible weight savings plus versatility gains. Although active control of wing store flutter has been successfully demonstrated in wind tunnel tests and in flight, there are drawbacks which hinder its use in practical applications. Among these drawbacks are: (1) need for accurate knowledge of unsteady aerodynamic control forces, particularly at transonic speeds where flutter is most likely to occur and theory is least developed; (2) need for high-power, fast acting control systems; and (3) marginal ability to increase flutter speed in cases of violent-type flutter.

A particular active flutter suppression concept investigated by Triplett et al. and described in "Active Flutter Suppression Systems for Military Aircraft—A Feasibility Study", AFFDL-TR-72-116, Feb. 1973, uses hydraulic actuators as the load carrying tie between wing and store. Through feedback control, the actuators nullify dynamic loads but transmit steady loads to the wing. By dynamically decoupling the wing/store system in this way, the flutter mechanism and speed revert to that of the bare wing. Unfortunately, this potentially promising scheme for wing/store flutter control was found to be impractical due to excessive flow rates required by the actuators.

Some research in helicopter design has focused on carrier pod alignment and vibration transfer. Active alignment systems as described in U.S. Pat. No. 3,904,156, include sensors which, when actuated by angular displacement of the helicopter pod, electronically initiate motion of the load arms to damp the displacement. One passive vibration isolator, described in U.S. Pat. No. 3,176,939, adds a pneumatic spring at each point of attachment of the pod to the carrier. These springs, tuned to be soft (with little resistance to external force), correspond to the tuned pylon arrangements seen in wing-store flutter suppression.

The need remains for an effective means of either compensating for or reducing the flutter burden placed on an aircraft wing by an attached store, allowing realignment of the store with the wing after angular displacements. The decoupler pylon described herein alleviates wing-store flutter using elements of both active and passive suppression. Bending and torsion mode frequencies are separated by the arrangement, thus increasing flutter speed without performance penalties.

An object of the present invention, then, is to provide means for suppressing wing-store flutter for all flight conditions within the aircraft's design envelope.

Another object of the present invention is to provide an attachment, the use of which will reduce the amount of flutter testing and analysis now necessary for aircraft that accommodate a large number of wing mounted store configuration.

Another object of the present invention is to provide an attachment, which can make flutter speed insensitive to variations in center of gravity and store inertia properties which may change during flight.

Another object of the present invention is to provide an arrangement wherein aspects of both passive and active flutter suppression may be employed.

Yet another object of the present invention is to provide an attachment wherein soft spring/damper elements decouple store pitch motions from the wing.

Another object of the present invention is to provide an attachment, whereby the store is isolated from shock and vibration loads, such as buffeting, induced by the wing or other support structure.

Still another object of the present invention is to provide an attachment wherein a low-power control automatically aligns the store with the wing under conditions of changing mean load.

SUMMARY OF THE INVENTION

These and other objects are achieved by a decoupler pylon attachment comprising elements of both passive and active flutter suppression methods. Passive spring elements control frequency and damping of the store pitch mode, by decoupling the store pitch from the support. The support is thus isolated from inertia moments associated with store pitch.

To avoid large static deflections, a drawback normally associated with soft suspension systems, a low frequency servo control system is used. The control system maintains alignment of the store relative to the support under conditions of varying load.

A damper may be included in the decoupler pylon arrangement to damp transient oscillations of the store. This is especially useful where the store may be subjected to violent gust loads, as when it is suspended from the wing or fuselage of an aircraft.

The active control system is triggered by a change in alignment of the store relative to the support, as recognized in compression or expansion of the passive spring elements. The passive and active elements may be integrated as a pneumatic system, or, among other possibilities, the passive element may be rubber or metallic spring means; the active element hydraulic or electrical.

BRIEF DESCRIPTION OF THE DRAWINGS

The invention will be described in connection with the accompanying drawings, in which.

DETAILED DESCRIPTION OF ONE EMBODIMENT

The concept of the decoupler pylon is based on the generally accepted premise that the mechanism of wing/store flutter is governed primarily by structural coupling between the wing and the store and that store aerodynamic effects are of secondary importance. Analysis and wind tunnel experiments indicate that when the store pitch frequency is below the wing bending frequency, flutter speed is not only increased above that of the bare wing but also becomes insensitive to changes in the pitch inertia and the center of gravity location of the store.

Figure 1:
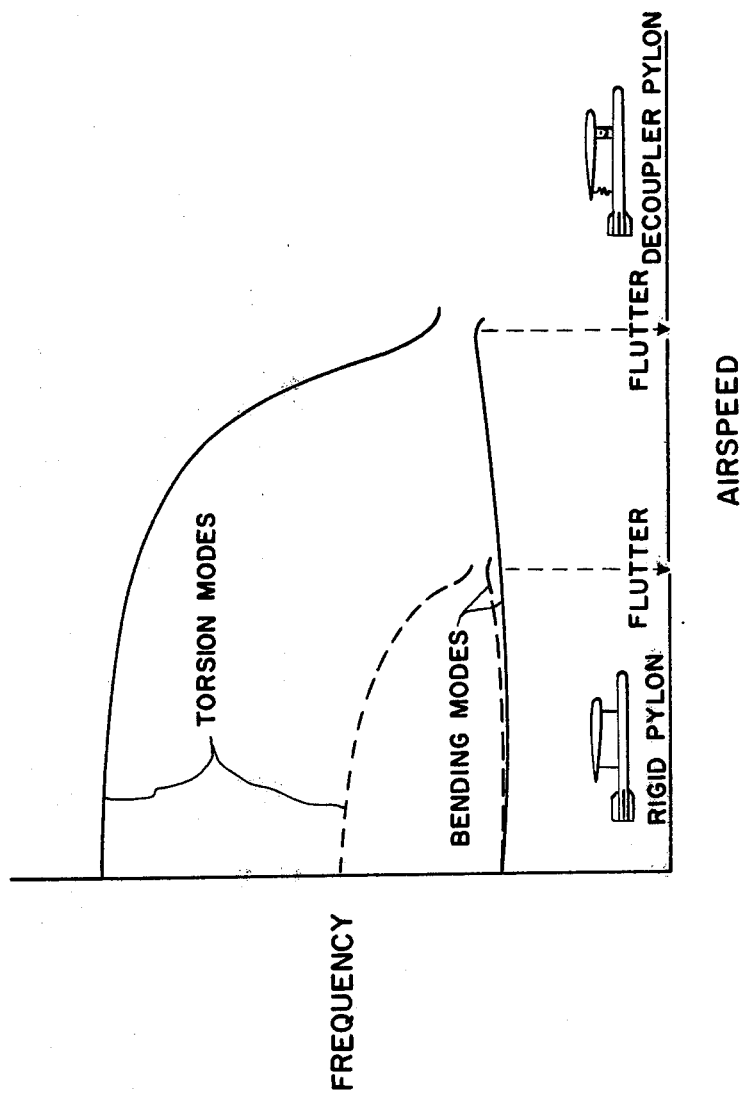
FIG. 1 is a graph describing the relationship between bending and torsion mode frequencies and flutter speed.

The rationale behind the decoupler pylon concept may be further discussed with the aid of FIG. 1. Classical bending torsion flutter involves coupling of at least two natural vibration modes, one or more of which contain torsional deformations of the wing. The plots in FIG. 1 illustrate the characteristic variation with airspeed of frequency of bending and torsion modes, which couple as flutter is approached. The dashed pair of curves represents a rigidly attached store and the solid pair a decoupler-pylon mounted store. Note in both cases that flutter occurs when the bending and torsion frequencies come close together. Since the decoupler pylon isolates the wing from inertia moments associated with store pitch, the wing torsion frequency with the decoupled store is substantially higher than that for the rigidly attached store, being about the same as for the bare wing. The bending frequency with store, however, is less than the bare wing frequency in both cases. Thus, as illustrated in FIG. 1, the decoupler pylon increases the frequency separation between the flutter critical modes, and as a consequence the flutter speed is increased.

Figure 2:
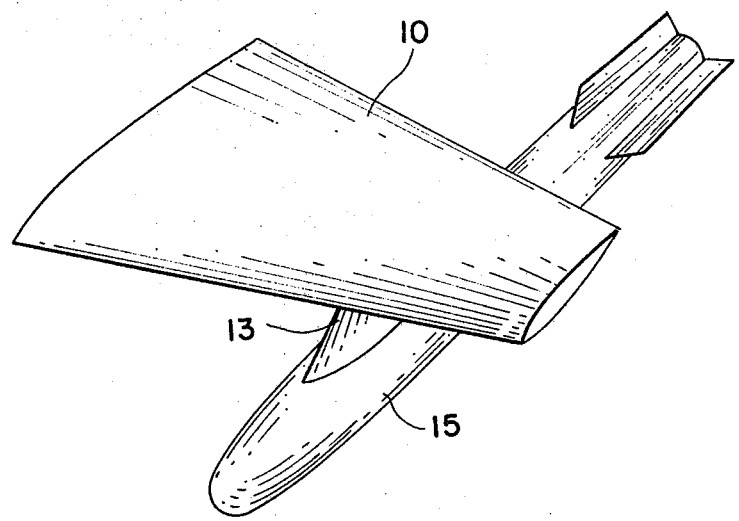
FIG. 2 is a perspective view of an airplane wing with store attached by means of the decoupler pylon.
Figure 3:
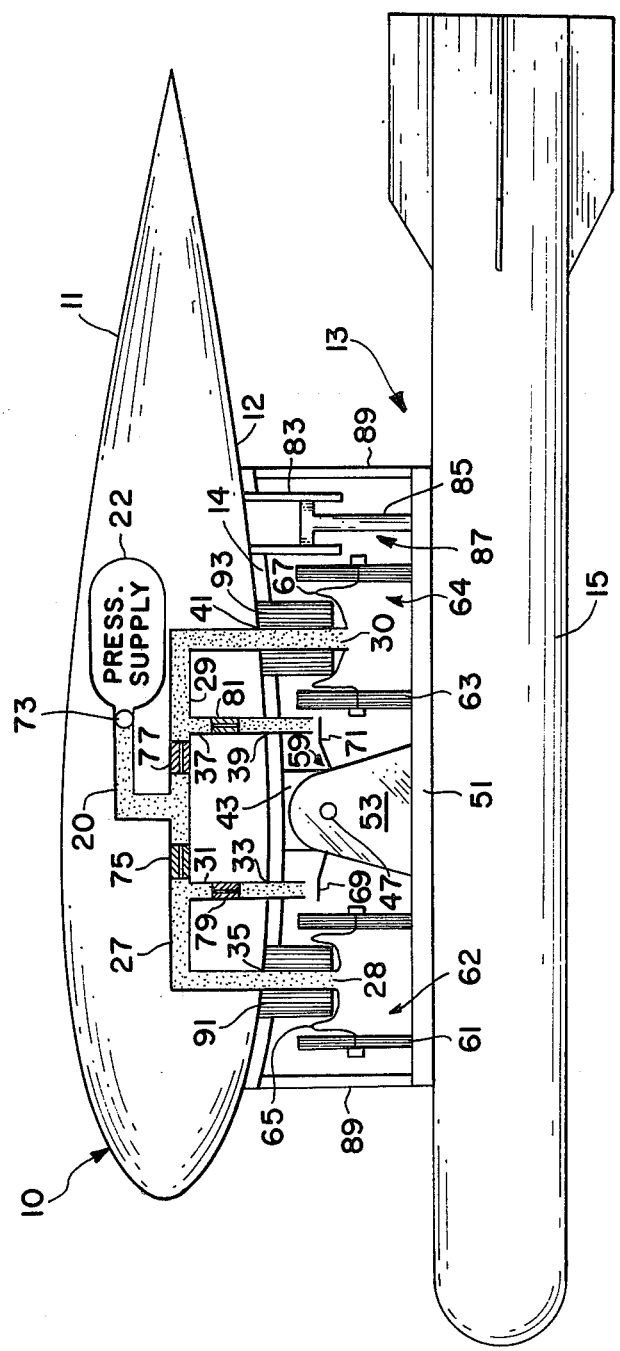
FIG. 3 is a schematic cross-sectional view of the decoupler pylon.

Referring to FIG. 2, there is shown a wing designated generally by the reference numeral 10, with store 15 attached by means of a decoupler pylon designated generally by the reference numeral 13. FIG. 3 shows a pneumatic embodiment of the decoupler pylon 13. The wing 10, with upper surface 11 and lower surface 12, includes an air supply line 20 connected to a pressurized air source 22. The air supply line 20 divides to yield two branches 27 and 29. Branch 27 extends forward, with vent passage 31 forking from it and exiting the wing 10 through an aperture 33 in the lower surface 12. Branch 27 continues beyond the vent passage 31, then turns to exit the wing 10 through an aperture 35 in the lower surface 12.

Branch 29 extends aft of the wing pivot 59, and, like branch 27, yields a vent passage 37. The vent passage 37 exits the wing 10 through an aperture 39 in the lower surface 12; the branch 29 continues back, then turns downward to exit the wing 10 through an aperture 41 in the lower surface 12.

Between vent passages 31 and 37 an arm 43 is fixedly associated with the lower surface 12 of the wing 10. The lower surface 12 may include, as depicted in FIG. 3, a panel 14 attached to the body of the wing 10. The extension is provided with a hole 45, shown in FIG. 4. The axis of hole 45 is approximately parallel to the wing elastic axis.

Figure 4:
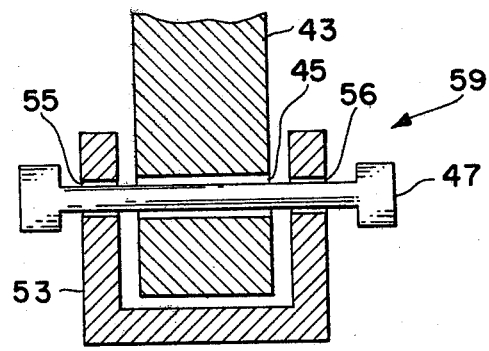
FIG. 4 is a front cross-sectional view of the pivot arrangement used in the described embodiment.

A clevis-type arm 53 is fixedly associated with the upper surface of the store 15. This upper surface may be, as depicted in FIG. 3, a panel 51 fixedly or removably attached to the body of the store 15. The clevis-type arm 53 is positioned such that wing arm 43 fits into the clevis. Holes 55 and 56 in the clevis arm 53 match the hole 45 of the wing arm 43, as shown in FIG. 4. A pin 47 inserted through said holes 45, 55 and 56, completes the pivot arrangement shown in FIGS. 3 and 4, and designated generally by the reference numeral 59. It will be noted that branch 27 and vent passage 31 lie forward of the pivot 59; branch 29 and vent passage 37 lie aft of the pivot 59.

Cylinders 61 and 63 are fixed to the upper surface panel 51 of the store 15. Cylinder 61 lies directly under the open end 28 of branch 27 of the air supply line 20; cylinder 63 corresponds similarly to the open end 30 of the branch 29 of the air supply line 20. Pistons 91 and 93 encase branches 27 and 29 from just above their open ends 28 and 30 to a point below apertures 35 and 41. A round, convoluted rubber seal 65 fixed to the lower surface of piston 91 and to cylinder 61 forms an airtight seal between the two and completes the construction of an air spring designated generally by the reference numeral 62. The rubber seal 65, does not seal the open end 28 of longitudinal branch 27.

A similar round, convoluted rubber seal 67 fixed to the lower surface of piston 93 and to cylinder 63 forms an airtight seal therebetween, completing the construction of an air spring designated generally by the reference numeral 64. The rubber seal 67 does not seal the open end 30 of branch 29.

Leaf-spring type flapper valves 69 and 71 attached to the clevis arm 53 are positioned beneath vent passages 31 and 37.

The air supply line 20 is provided with a pressure regulator valve 73, located at the pressurized air source 22. Flow restrictors 75 and 77 are positioned in the branches 27 and 29, flow restrictor 75 aft of the vent passage 31 and flow restrictor 77 foreward of the vent passage 37. These valves may be one-way flow restrictors. Needle valves 79 and 81 are located in vent passages 31 and 37 respectively.

A dashpot damper designated generally by the reference numeral 87, comprising a cylinder 83 fixedly associated with the lower surface panel 14 of the wing 10 and a piston 85 fixedly associated with the upper surface panel 51 51 of the store 15 is included in this embodiment, and located aft of branch 29 and cylinder 63. In one experimental embodiment a dashpot damper manufactured by the Airpot Corporation and described in U.S. Pat. No. 3,175,646 was used.

A housing 89 encloses the decoupler pylon 20 as above described.

In operation, the air springs 62 and 64 regulate store pitch stiffness and act by feedback control to align the store 15 with the wing 10 under conditions of changing mean load. Air is supplied to the springs 62 and 64 through the air supply line 20 from the pressurized air source 22 and pressure regulator valve 73. Pressure regulator valve 73 and flow restrictors 75 and 77 regulate the flow of air through branches 27 and 29 and to pressure release vents 31 and 37. Pitch stiffness is controlled by the supply pressure, and store alignment by pressure difference in the air springs 62 and 64. This pressure difference is achieved through vent passages 31 and 37. The flapper valves 69 and 71 modulate flow exiting the vent passages 31 and 37. Stiffness and response time of the decoupler pylon 30 are governed by the needle valves 79 and 81 in the vent passages 31 and 37, and by the dashpot damper 87. As mentioned before, the damper 87 also damps oscillations of the store due to transient loads.

The pressurized air source 22 provides a constant supply of air to the air springs 62 and 64. Under steady aerodynamic conditions, the store 15 remains aligned with the wing 10. Imagine now that due to a changed aerodynamic drag the store 15 has pitched nose down. With the downward pitch, flapper valve 71 closes and 69 opens. Since more air is released through vent passage 31 than through passage 37, air spring 64 fills and expands; air spring 62 empties and is easily compressed as the decoupler pylon moves about the pivot 59. Pressure regulator valve 73 and flow restrictors 75 and 77 fix the rate of supply of air to the air springs 62 and 64, and inhibit change in the direction of air flow. They thus ensure expansion and compression of the air springs 62 and 64. With the expansion of air spring 62, the alignment of the store 15 is actively changed until it is at the desired position with respect to the wing 10.

The decoupler pylon operates in much the same way in response to a tail-down pitch of the store. With such an "upward" pitch, flapper valve 69 closes and 71 opens. Since more air is released through vent passage 37 than through passage 31, air spring 62 fills and expands; air spring 64 empties and is compressed. The alignment of the store 15 is actively changed to restore it to its desired position with respect to the wing 10.

The damper 87 is used to add stability to the store automatic alignment control system and also to reduce the amplitude of store pitch oscillations due to transient loads such as gusts or maneuvers.

The decoupler pylon apparatus as described in the pneumatic embodiment increases flutter speed to a level at or above bare wing flutter speed. Since the store is allowed to pitch relatively independently of the aircraft, the store pitch modes are effectively decoupled from wing bending modes. Because of this increase in frequency separation of the flutter critical wing bending and tension modes, the desired increase in flutter speed is obtained.

Figure 5:
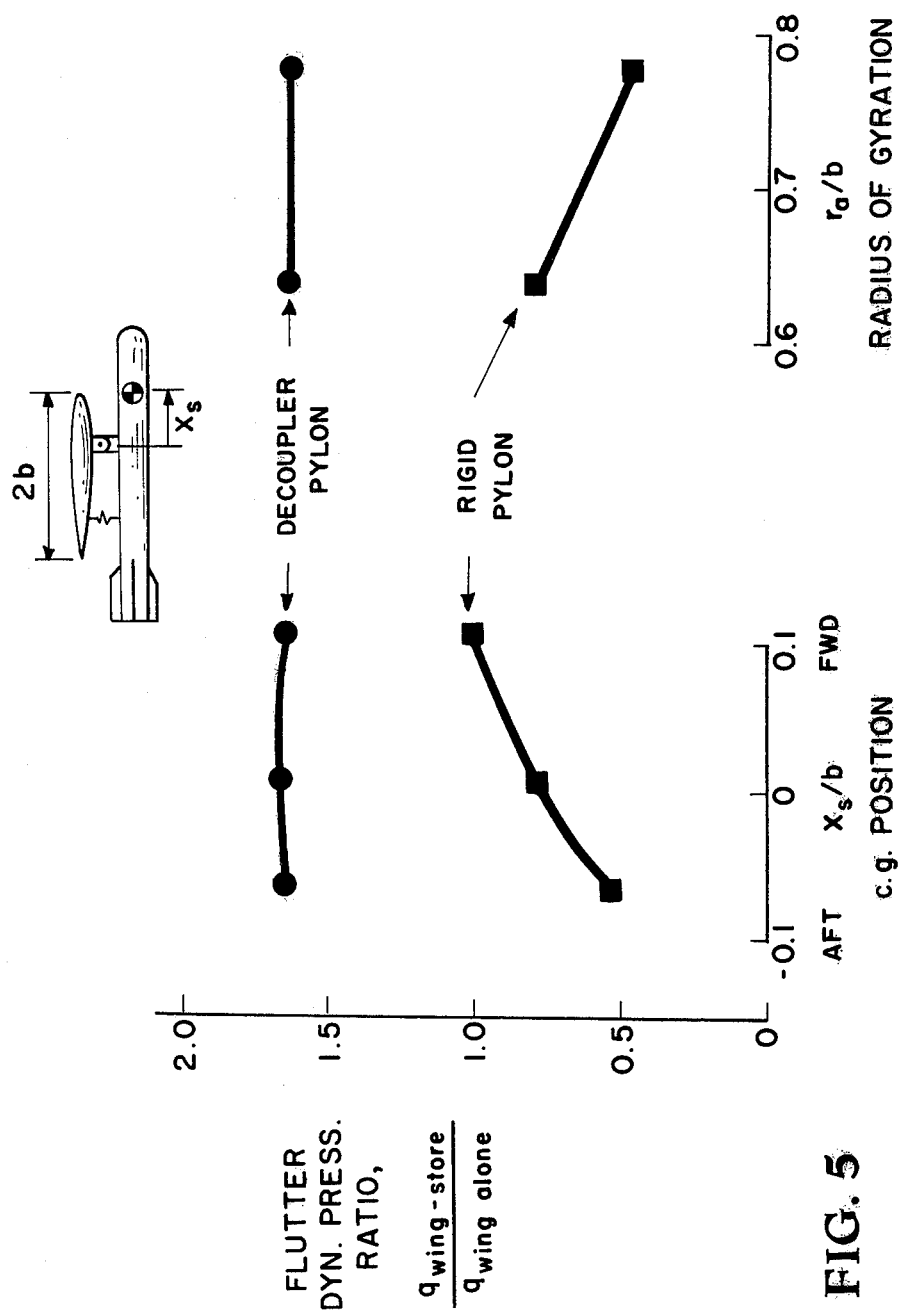
FIG. 5 is a graph describing wind tunnel test results using a model of the described embodiment.

FIG. 5 represents some results from wind tunnel tests of a model wing store flutter with the decoupler pylon. In this graph, the following symbols are used:

q=flutter dynamic pressure
$X_s$=store center of gravity location, measured from store pivot, positive aft
b=wing semichord
$r_a$=store radius of gyration around pivot From these results, it is evident that, in addition to increasing the flutter speed, the decoupler pylon makes flutter relatively insensitive to inertia and center of gravity location of the store. This feature can greatly simplify and reduce the analysis and testing required to flutter-clear aircraft that must carry a large variety of stores.

Aside from wing/store flutter alleviation the decoupler pylon self-alignment feature might also be used as an aid in aiming aircraft launched missiles. Aeroelastic loads associated with high-g maneuvers can cause elastic deformations of the wing tip relative to the root which adversely affect aiming or target acquisition for outboard-mounted missiles. To compensate for such aeroelastic effects, the decoupler pylon could be used as a means of aligning the missile axis with the wing root or aircraft centerline instead of with the wing structure at the store attachment points.

The decoupler pylon may further be of use in suspending, from any support, a store prone to damage from shock or vibration. A soft pylon suspension system effectively isolates the store from vibration and shock loads transmitted from the supporting structure.

It must be emphasized that the above specification relates to just one of many conceivable embodiments of the invention. The decoupler pitch spring means may be metallic, rubber or air spring means; the active controls may be hydraulic, pneumatic or electrical, among other possibilities. The pivot arrangement 59 need not be the simple apparatus of FIG. 2, which apparatus is designed to secure a store for the duration of a flight. The advanced and highly specialized ejection attachments of modern aircraft may be used, some with slight modification.

The specifications herein discussed are not meant as limitations on the scope of the invention and its underlying theory. The above description refers to one embodiment of the invention; other embodiments will be obvious to those skilled in the art.

What is claimed is:

1. A device for suspending a store from a support, comprising:
   an airfoil lifting surface subjected to flutter;
   store means;
   means for suspending said store means from said airfoil lifting surface and enabling movement thereabout;
   soft-spring means connected between said airfoil lifting surface and said store means; and
   control means actuated by movement of said soft-spring means;
   said soft-spring means and control means maintaining alignment of said store means about a spanwise axis of the lifting surface and isolating the pitch modes of the store means from the torsion modes of the airfoil lifting surface alleviating airfoil lifting surface flutter and vibratory loads.

2. A device as in claim 1 including damper means whereby transient oscillations of said store are damped.

3. A device as in claim 1 wherein said support is an aircraft wing.

4. A device as in claim 1 wherein said support is an aircraft fuselage.

5. A device as in claim 1 wherein said means for suspending said store from said support is pivot means, said pivot means having a pivot axis.

6. A device as in claim 5, hwerein said soft-spring means and said control means are pneumatic means.

7. A device as in claim 6, wherein said soft-spring means include air springs connected between said store and said support on either side of said pivot axis.

8. A device as in claim 7, wherein said control means include a constant supply of air to said air springs, said supply of air reaching said air springs by way of air supply lines; pressure release vents branching from said air supply lines; and valve means associated with said pressure release vents, whereby said pressure release vents are regulated.

9. A device as in claim 8, wherein said valve means are flapper valve means, attached to said pivot axis and covering said pressure release vents.

10. A device as in claim 9, wherein said air supply lines have flow restrictor means for regulating the supply of air to said air springs.

11. A device as in claim 10, wherein said pressure release vents have valve means for regulating the rate of release of air through said pressure release vents.

12. A device as in claim 11 including damper means whereby transient loads are damped, and whereby response time and stability of said control system are partially regulated.

* * * * *